US008924152B2

(12) United States Patent
Hunt et al.

(10) Patent No.: US 8,924,152 B2
(45) Date of Patent: Dec. 30, 2014

(54) REMOTE MANAGEMENT SYSTEM FOR EQUIPMENT

(75) Inventors: Aaron Dale Hunt, Bellefonte, PA (US); Jeffrey Allen Dearborn, Southaven, MS (US)

(73) Assignee: AgJunction LLC, Hiawatha, KS (US)

( * ) Notice: Subject to any disclaimer, the term of this patent is extended or adjusted under 35 U.S.C. 154(b) by 178 days.

(21) Appl. No.: 13/117,389

(22) Filed: May 27, 2011

(65) Prior Publication Data

US 2011/0295460 A1 Dec. 1, 2011

Related U.S. Application Data

(60) Provisional application No. 61/349,707, filed on May 28, 2010, provisional application No. 61/349,695, filed on May 28, 2010, provisional application No. 61/349,703, filed on May 28, 2010.

(51) Int. Cl.
*G06Q 50/02* (2012.01)
*G06Q 10/00* (2012.01)
*G06Q 10/06* (2012.01)

(52) U.S. Cl.
CPC ............... *G06Q 50/02* (2013.01); *G06Q 10/00* (2013.01); *G06Q 10/06311* (2013.01); *G06Q 10/063114* (2013.01)
USPC .................. 701/517; 701/2; 701/50; 701/409; 701/431; 701/445; 37/348; 37/414; 37/195; 37/443; 172/5; 172/71; 172/134; 172/438

(58) Field of Classification Search
CPC ........... E02F 9/2025; E02F 9/26; E02F 9/205; A01B 79/005; A01B 63/00; B60R 25/24; B60R 2325/205; B60R 25/102; B60R 25/33
USPC .................. 701/2, 50, 92, 409, 431, 445, 408; 37/348, 414, 195, 443; 172/134, 438, 172/5, 71
See application file for complete search history.

(56) References Cited

U.S. PATENT DOCUMENTS

| 5,631,658 | A | * | 5/1997 | Gudat et al. | 342/457 |
| 5,646,844 | A | * | 7/1997 | Gudat et al. | 701/409 |
| 6,236,924 | B1 | | 5/2001 | Motz et al. | |
| 6,856,879 | B2 | * | 2/2005 | Arakawa et al. | 701/50 |
| 6,954,689 | B2 | * | 10/2005 | Hanson et al. | 701/32.4 |

(Continued)

FOREIGN PATENT DOCUMENTS

| WO | 0004341 A2 | 1/2000 |
| WO | 0058801 A1 | 10/2000 |

*Primary Examiner* — John R Olszewski
*Assistant Examiner* — Truc M Do
(74) *Attorney, Agent, or Firm* — Law Office of Mark Brown, LLC; Mark E. Brown; Christopher M. DeBacker

(57) ABSTRACT

A system is provided for monitoring system and operational parameters on one or more pieces of machinery or equipment. The system can monitor the pieces of machinery or equipment in real time, i.e., the time delay between the taking of a measurement on a piece of equipment and its subsequent display in the system is within accepted standards, e.g., from about 1 second to about 1 minute depending on the type of measurement or data set being monitored. The system can also permit the tracking of the pieces of machinery or equipment and can enable the transfer, i.e., the sending and/or receiving, of information between the system and the pieces of machinery or equipment.

1 Claim, 4 Drawing Sheets

(56) References Cited

U.S. PATENT DOCUMENTS

| | | | |
|---|---|---|---|
| 7,513,070 B2* | 4/2009 | Ogura et al. | 37/348 |
| 8,139,108 B2* | 3/2012 | Stratton et al. | 348/114 |
| 8,260,736 B1* | 9/2012 | Lear et al. | 706/46 |
| 2002/0059320 A1* | 5/2002 | Tamaru | 707/200 |
| 2004/0148083 A1* | 7/2004 | Arakawa et al. | 701/50 |
| 2005/0060127 A1* | 3/2005 | Carter et al. | 702/188 |
| 2005/0187731 A1* | 8/2005 | Ericsson et al. | 702/92 |
| 2006/0026101 A1* | 2/2006 | Ogura et al. | 705/50 |
| 2006/0041845 A1* | 2/2006 | Ferguson et al. | 715/751 |
| 2007/0124000 A1* | 5/2007 | Moughler et al. | 700/9 |
| 2007/0129869 A1* | 6/2007 | Gudat et al. | 701/50 |
| 2009/0164054 A1 | 6/2009 | Peterson et al. | |
| 2009/0177337 A1* | 7/2009 | Yuet et al. | 701/2 |
| 2010/0036696 A1* | 2/2010 | Lang et al. | 705/7 |
| 2010/0161175 A1* | 6/2010 | Yamada et al. | 701/35 |
| 2011/0160919 A1* | 6/2011 | Orr et al. | 700/283 |
| 2011/0160920 A1* | 6/2011 | Orr et al. | 700/283 |

* cited by examiner

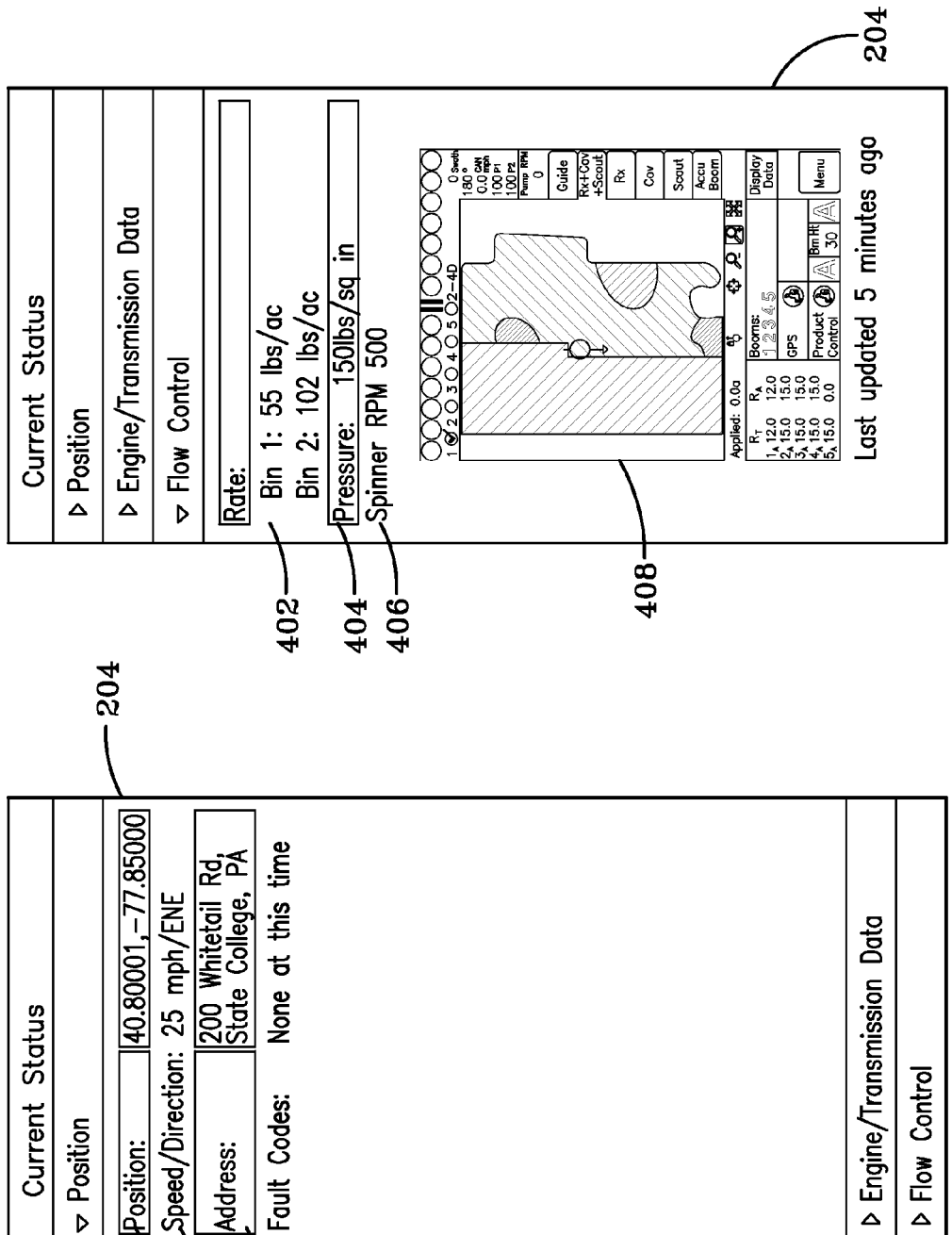

REMOTE MANAGEMENT SYSTEM FOR EQUIPMENT

CROSS-REFERENCE TO RELATED APPLICATIONS

This application claims the benefit of U.S. Provisional Application No. 61/349,707, entitled "REMOTE MANAGEMENT SYSTEM FOR EQUIPMENT," filed May 28, 2010, U.S. Provisional Application No. 61/349,695, entitled "SYSTEM AND METHOD FOR WORKORDER MANAGEMENT," filed May 28, 2010, and U.S. Provisional Application No. 61/349,703, entitled "SYSTEM AND METHOD FOR COLLECTING AND PROCESSING AGRICULTURAL FIELD DATA," filed May 28, 2010, which applications are hereby incorporated by reference in their entirety.

BACKGROUND

The application generally relates to the management of machines or equipment. The application relates more specifically to a system for the remote monitoring and/or processing of machine or equipment data in "real time" and the remote management or control of one or more machines or pieces of equipment.

Previously, a user responsible for the operation of several pieces of machinery or equipment was not able to easily keep track of the pieces of machinery once they were deployed at job sites, e.g., agricultural fields or locations. For example, to learn the exact location of a deployed piece of equipment, the user would have to either drive to the assigned job site or contact the operator of the deployed piece of equipment to learn the location of the equipment. However, if the piece of equipment was at the wrong site or the operator was not sure of the location, the user would not be able to learn of the location of the deployed piece of equipment. Similarly, for the user to learn the operational status of a deployed piece of equipment, the user would have to either drive to the assigned job site or contact the operator of the deployed piece of equipment to learn the operational status of the equipment. The lack of easily obtainable position information and operational status information for machinery or equipment can make it difficult for a user to effectively manage the scheduling of jobs and maintenance for the pieces of equipment or machinery.

In addition, when a user wanted to send information to a piece of equipment at a job site, the user would have to transmit the information to the equipment operator by phone or other communication technique, which transmission process could be time consuming and lead to errors being introduced into the information. Further, any information for the user from the piece of equipment had to be sent back to the user using the same time consuming and error prone techniques.

Therefore, what is needed is a system that can enable a user, from a single location, to monitor the location and operational status of equipment or machines and to send and receive information from the equipment or machines.

SUMMARY

The present application is directed to an equipment management system for monitoring agricultural equipment. The equipment management system includes a first computing device mounted on a piece of agricultural equipment, a global positioning system device mounted on the piece of agricultural equipment, a sensor configured and positioned to measure an operational parameter of the piece of agricultural equipment, and a wireless modem in communication with the first computing device. The global positioning system device is configured to calculate a position of the piece of agricultural equipment and provide the calculated position to the first computing device. The sensor is configured to provide the measured operational parameter to the first computing device. The wireless modem is configured to send and receive information over the Internet. The equipment management system includes a second computing device located remote from the first computing device. The second computing device is configured to receive position and operational parameter information transmitted by the wireless modem from the first computing device and to display the received positional and operational parameter information for a user.

The present application is additionally directed to a system having a first computer and a plurality of second computers. Each second computer of the plurality of second computers is positioned on a corresponding piece of equipment at a remote location from the first computer. The system also has an equipment monitoring system including a first computer algorithm executable by a microprocessor from the first computer and a second computer algorithm executable by a microprocessor from a second computer. The first computer algorithm operates to permit a user to view a location of each piece of equipment having a second computer, obtain status information on each piece of equipment having a second computer and transmit job information to any piece of equipment having a second computer. The second computer algorithm operates to transmit position information on the corresponding piece of equipment to the first computer, transmit status information on the corresponding piece of equipment to the first computer and perform a job in accordance with job information received from the first computer.

One advantage of the present application is the ability to monitor and manage multiple pieces of machinery or equipment from a single location, i.e., a web page.

Another advantage of the present application is the ability to transmit prescription information directly to a piece of equipment without the need for manual entry at the piece of equipment.

Still another advantage of the present application is remote monitoring of equipment for maintenance purposes.

Yet another advantage of the present application is better and more accurate reporting capabilities regarding machine or equipment operation to comply with governmental requirements.

A further advantage of the present application is a reduction in the misapplication of materials by machines or equipment and a reduction in the misuse of machines or equipment thereby reducing the corresponding liability associated with such actions.

Other features and advantages of the present application will be apparent from the following more detailed description of the preferred embodiment, taken in conjunction with the accompanying drawings which illustrate, by way of example, the principles of the application.

BRIEF DESCRIPTION OF THE DRAWINGS

FIGS. 3 and 4 shows exemplary embodiments of the status window from the web page display of FIG. 2.

Wherever possible, the same reference numbers are used throughout the drawings to refer to the same or like parts.

DETAILED DESCRIPTION OF THE EXEMPLARY EMBODIMENTS

Figure 1:
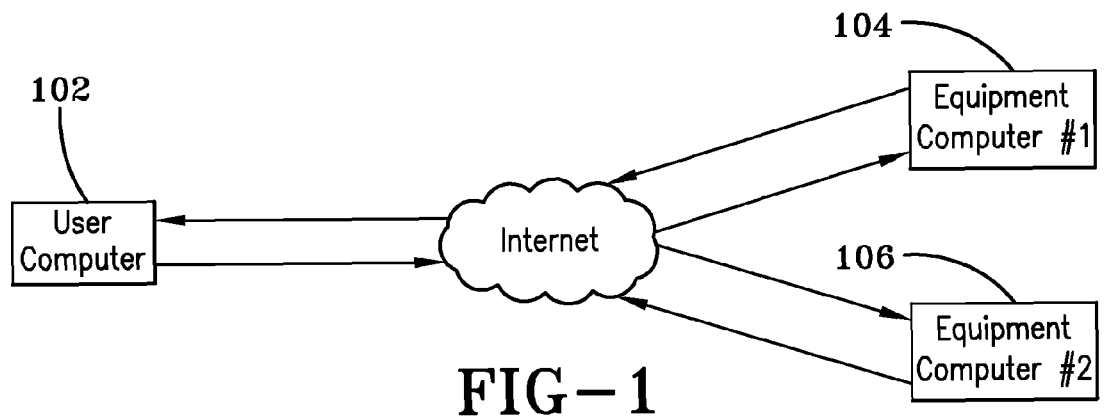
FIG. 1 shows schematically an exemplary embodiment of the transmission of information between a user and multiple pieces of equipment.

The present application is directed to a system for monitoring system and operational parameters on one or more pieces of machinery or equipment. In one exemplary embodiment, the equipment monitoring system can monitor the pieces of machinery or equipment in real time, i.e., the time delay between the taking of a measurement on a piece of equipment and its subsequent display in the equipment monitoring system is within accepted standards in the field. In one exemplary embodiment, an acceptable time delay can range from about 1 second to about 1 minute depending on the type of measurement or data set being monitored. The equipment monitoring system can also permit the tracking of the pieces of machinery or equipment and can enable the transfer, i.e., the sending and/or receiving, of information between the equipment monitoring system and the pieces of machinery or equipment.

In an exemplary embodiment, the equipment monitoring system can be an "online system" that is accessed by a user over the Internet or other similar type of computer network. The use of the Internet or other type of computer network permits the transfer, i.e., the sending and/or receiving, of information between the user and the piece of equipment without the user having to be in close proximity to the piece of equipment. In addition, since the equipment monitoring system uses the Internet to transfer information, the user can access the system with any device that includes Internet connection functionality, e.g., network cards, wireless modems, transceivers, etc., and display software, e.g., a web browser. Some examples of devices a user can use to access the system are desktop computers, laptop computers, tablet computers, net books, handheld devices, e.g., "smart" phones, and other similar devices. The user may be required to enter personally identifiable information, e.g., a user name and password, to permit the system to identify the user. Once the user is identified by the system, the system can retrieve a user profile for the user that can include the pieces of machinery or equipment that the user is authorized to monitor and user preference information.

In one exemplary embodiment, the equipment monitoring system is used in the agricultural industry to permit a user to monitor agricultural equipment or machinery and to exchange information with the agricultural equipment and machinery. The equipment monitoring system can be included in or be a part of a larger agricultural management system. However, in other embodiments, the equipment monitoring system can be a stand-alone application that operates separate from other agricultural management systems. If the equipment monitoring system is separate from other agricultural management systems, the equipment monitoring system can be in communication with the other agricultural management systems to exchange data as required.

In one embodiment, the equipment monitoring system can be computer programs, algorithms or software stored in the non-volatile memory of corresponding computers or computing devices accessible by the user or associated with the pieces of equipment or machinery. The computer programs, algorithms or software can have a series of instructions executable by a corresponding microprocessor of the computer or computing device. While the equipment monitoring system can be embodied in a computer program(s) and executed by microprocessor, it will be understood by those skilled in the art that the equipment monitoring system may have some functions implemented and executed using digital and/or analog hardware, especially on the computer or computing device associated with the pieces of equipment or machinery. The equipment monitoring system also includes user interfaces accessible by the user and the machinery or equipment operators.

FIG. 1 shows an embodiment of the transmission of information between a user and multiple pieces of equipment using the equipment monitoring system of the present application. In the exemplary embodiment shown in FIG. 1, a user can monitor the status of a first piece equipment and a second piece of equipment using a corresponding user computer 102. The user computer 102 can transmit requests for status information over the Internet to remote equipment or machinery, i.e., a first equipment status request can be transmitted to equipment computer #1 104 and a second equipment status request can be transmitted to equipment computer #2 106. As the corresponding equipment status information requests are completed, the corresponding equipment status information is transmitted back to the user computer 102 by the equipment computer #1 104 and equipment computer #2 106 for review by the user. In another embodiment, the user computer 102 can send other information, e.g., a prescription plan for a particular field or location, to the equipment computer #1 104 and the equipment computer #2 106 and receive corresponding information back from the equipment computer #1 104 and the equipment computer #2 106.

Figure 2:
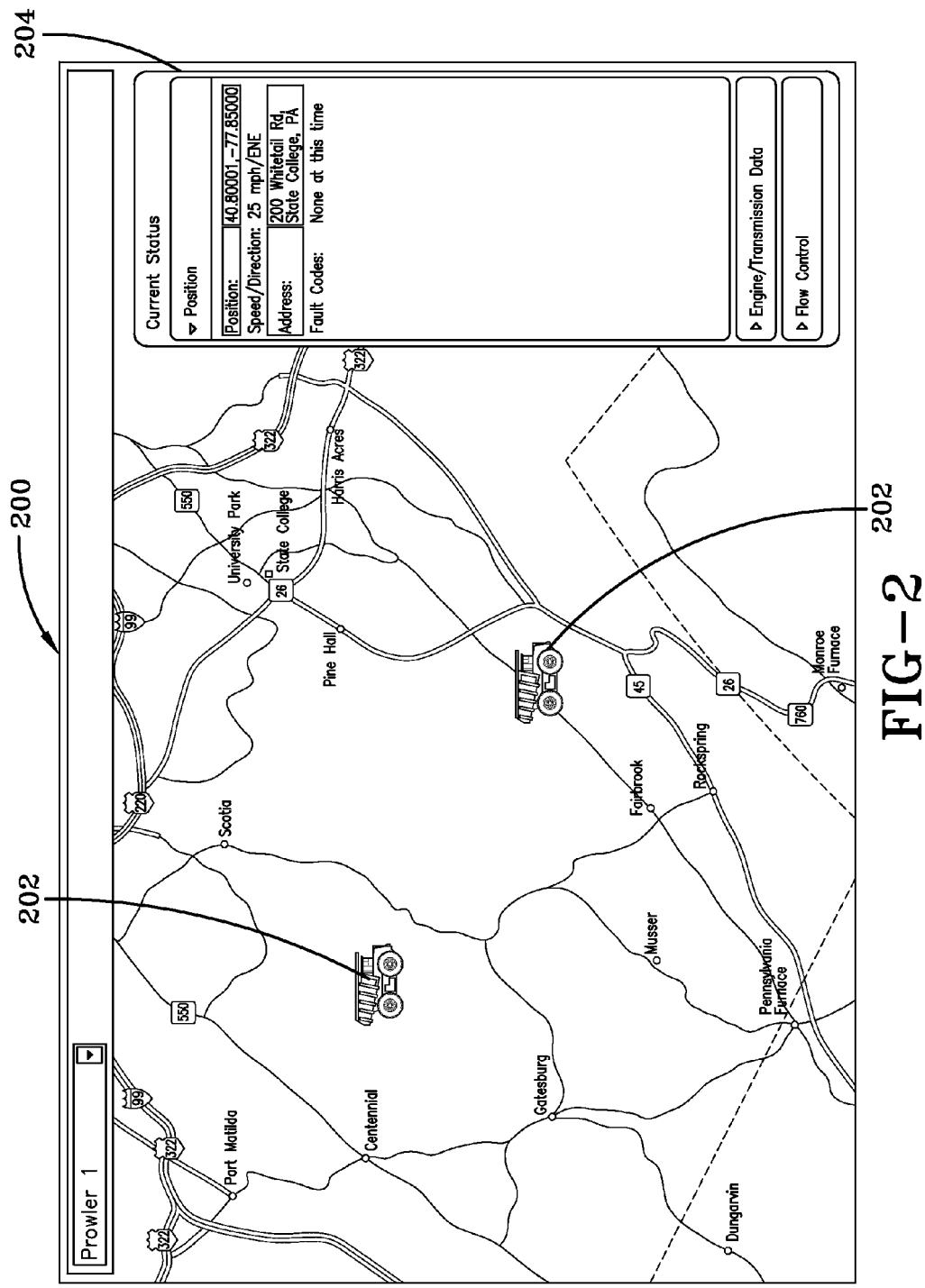
FIG. 2 shows an exemplary embodiment of a web page with equipment or machinery locations for the equipment monitoring system.

FIG. 2 shows an exemplary embodiment of a web page, as displayed by a web browser, with the locations of pieces of equipment that can be monitored with the equipment monitoring system. An authorized user can be provided with a web page or other similar type of file or display 200 that provides information on the locations of pieces of equipment or machinery 202 that the user is authorized to monitor and/or manage. In one exemplary embodiment as shown in FIG. 2, the user is provided with a map showing the location of the pieces of equipment in a general area. However, in another exemplary embodiment, the user can be provided with a list of equipment that the user is authorized to monitor and manage. If only a list is provided, the user has to select a piece of equipment before map information may be displayed.

In addition to viewing the locations of pieces of equipment 202 on the map, the user can also obtain more specific information regarding a specific piece of equipment. To obtain more specific information on a piece of equipment, the user can select the icon on the map corresponding to a piece of equipment or can select a piece of equipment from a menu on the screen. When the user selects an icon, the user can be provided with a status webpage, window, display or file 204 that includes additional information on the selected piece of machinery or equipment. The additional information that can be provided in the status window 204 includes additional location information, engine and/or transmission data, flow control information, maintenance records or machine or equipment parameters. In another exemplary embodiment, if the user has already selected a piece of equipment, then the additional location information, engine and/or transmission data and flow control information can be displayed for the user.

In an exemplary embodiment as shown in FIG. 3, the user can receive location information in the status window 204. The location information provided in the status window 204 can include information such as map coordinates 302, i.e., latitude and longitude, for the piece of equipment, wind speed and direction at the location 304, a weather radar image for the location, the speed of the piece of equipment and a corresponding street address of the location 306. In an exemplary embodiment, the location information can be provided wirelessly to the equipment monitoring system by a global positioning system (GPS) device or other computing device installed on the piece of equipment. The installed GPS device and corresponding software used with the GPS device can provide detailed location information wirelessly to the equipment monitoring system. The GPS device can be programmed or configured to provide or send location information to the equipment monitoring system at any desired interval ranging between fractions of a second to multiple seconds.

For engine and/or transmission data, the user can receive information such as engine (oil) temperature, transmission (fluid) temperature, the number of hours the engine has been operating, and any other parameter that is monitored by or available from the onboard engine management system. In addition, the user is provided with the option to "View Dashboard," which permits the user to view information that may be displayed on the dashboard for the piece of equipment. In an exemplary embodiment, the engine and/or transmission data can be provided to the equipment monitoring system by one or more corresponding sensors installed into the piece of equipment. The sensors can have wireless communication functionality or can communicate information to a controller that has wireless communication functionality or to the equipment computer. The installed sensors and corresponding software used with the sensors can provide operational parameter information wirelessly to the equipment monitoring system. The installed sensors can be programmed to provide operational parameter information at any desired interval ranging between fractions of a second to multiple seconds. If one of the engine and/or transmission parameters that are being monitored are outside of a preselected range, the equipment monitoring system can provide the user and/or operator with an alert. The alert can be displayed on the web page viewed by the user or the alert can be transmitted to the user by other electronic communication techniques, e.g., email.

In one exemplary embodiment, when an alert is generated for a piece of equipment, the equipment monitoring system can permit a technician to remotely access the piece of equipment for maintenance and troubleshooting. The technician can review the current status information on the piece of equipment (and possibly historic status information, if available) to attempt to diagnose the situation that generated the alert. Depending on the circumstances that generated the alert, the technician can implement a remedial action to remotely correct the situation using the equipment monitoring system. In another embodiment, the technician can access the piece of equipment using the equipment monitoring system for routine maintenance purposes without the presence of an alert.

In an exemplary embodiment, the user can also receive information on the amount of material being distributed by the piece of equipment, i.e., flow control information, when the piece of equipment is in operation. The information on the amount material being distributed is dependent on the type of material being distributed, i.e., liquid material vs. solid material. In one exemplary embodiment as shown in FIG. 4, the user can receive flow control information in the status window 204. The flow control information provided in the status window 204 can include information such as the application rate 402 (e.g., pounds per acre, lbs/ac) for each bin or tank associated with the piece of equipment, the hydraulic pressure 404 (e.g., pounds per square inch, lbs/sq in) associated with the piece of equipment and the speed of rotating components associated with the piece of equipment 406 (e.g., the speed of a spinner in revolutions per minute, rpm). The flow control information can also include an application map 408 that provides information on the application of the materials. In an exemplary embodiment, the flow control information can be provided by one or more corresponding sensors installed on the piece of equipment. The sensors can have wireless communication functionality or can communicate information to a controller that has wireless communication functionality or to the equipment computer. The installed sensors and corresponding software used with the sensors can provide flow control information wirelessly to the equipment monitoring system. The installed sensors can be programmed to provide flow control information at any desired interval ranging between fractions of a second to multiple seconds. Similar to the engine and/or transmission information, if one of the flow control parameters that are being monitored are outside of a preselected range, the equipment monitoring system can provide the user and/or operator with an alert. The alert can be displayed on the web page viewed by the user or the alert can be transmitted to the user by other electronic communication techniques, e.g., email.

The equipment monitoring system also provides the user with the ability to exchange information with the piece of equipment. Upon selecting a particular piece of equipment, the user can transmit location information to the piece of equipment to have the piece of equipment relocated to a desired location. In addition, the user can transmit a prescription or recommendation plan to the piece of equipment for a particular location to configure the piece of equipment to apply certain materials in certain amounts in certain areas. The transmitted prescription or recommendation plan can be automatically loaded into the equipment computer without operator action. As discussed above with regard to FIG. 4, the equipment monitoring system can also track the progress of the piece of equipment with respect to the particular prescription in the status window 204.

Figure 5:
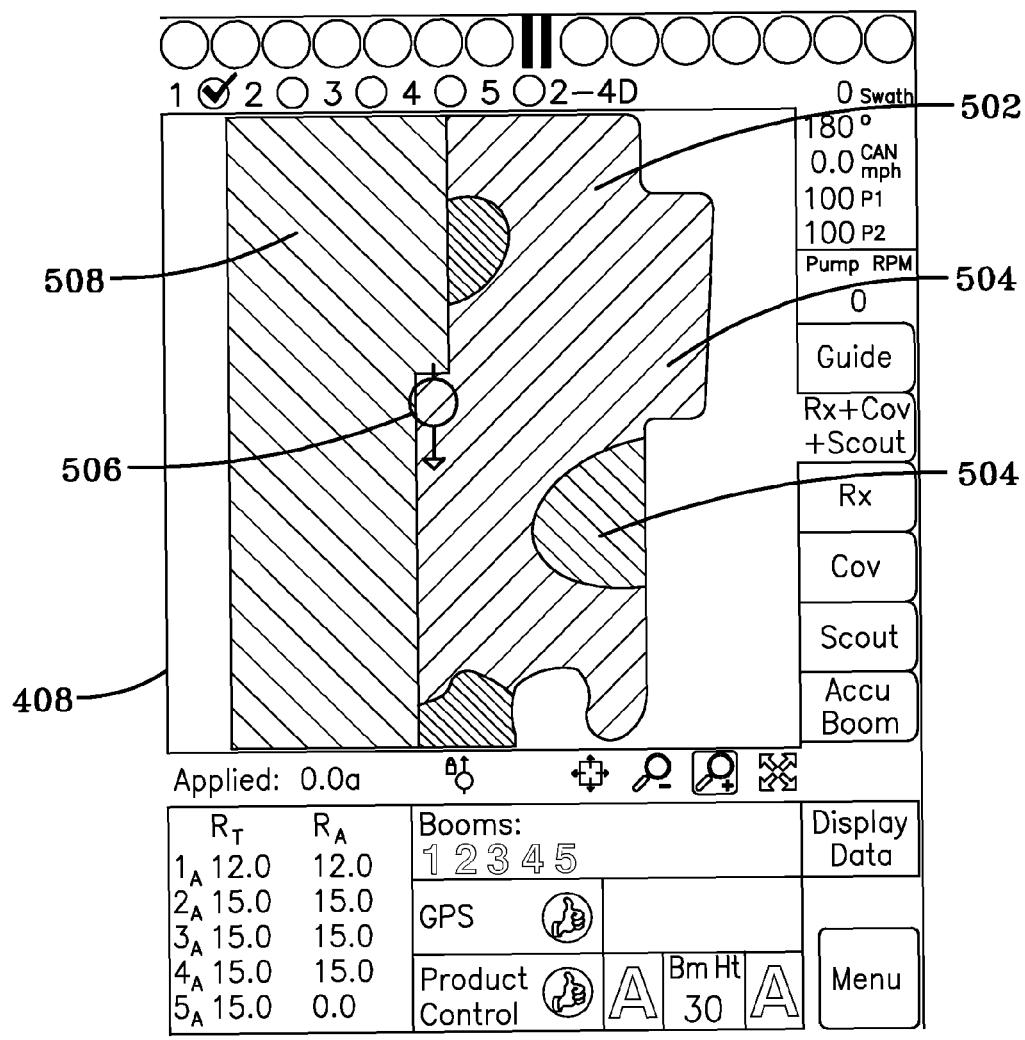
FIG. 5 shows an exemplary embodiment of the equipment progress field from the status window of FIG. 4.

FIG. 5 shows an exemplary embodiment of the tracking of the progress of a piece of equipment relative to a transmitted prescription or application plan. The progress of the piece of equipment can be shown in a field 408 of the status window 204 or as a separate web page or display. The field 408 can show the predefined field or location 502 associated with the transmitted prescription or application plan. The transmitted prescription or application plan for the predefined field or location 502 is shown with respect to the predefined field or location 502 and can include zones 504 that involve different treatment actions or equipment configurations. The transmitted prescription or application plan can include information regarding the particular equipment setup or configuration for each of the zones 504. As the piece of equipment enters a particular zone during the treatment process, the information from the transmitted prescription or application plan can be automatically applied to the piece of equipment to adjust the operating configuration of the piece of equipment to that required for the new zone. In another embodiment, the transmitted prescription or application plan can trigger an alert for the operator to manually adjust the configuration for the piece of equipment when the equipment is approaching a new zone.

The piece of equipment can include a GPS device to determine the location of the piece of equipment relative to the predefined field or location 502. An equipment indicator 506 can be shown to indicate the position of the piece of equipment relative to the predefined field or location 502. Further, the area 508 of the predefined field or location 502 where the transmitted prescription or application plan has already been applied (or treated), i.e., the required action or task from the prescription or application plan has been completed, can be shown. When the piece of equipment has finished with the transmitted prescription or application plan, the piece of equipment can send information to the equipment monitoring system with the amount of material actually applied (using measured data from the sensors) for particular locations (using information from the GPS device). The equipment monitoring system can then provide the actual applied amount information to the user.

Figure 6:
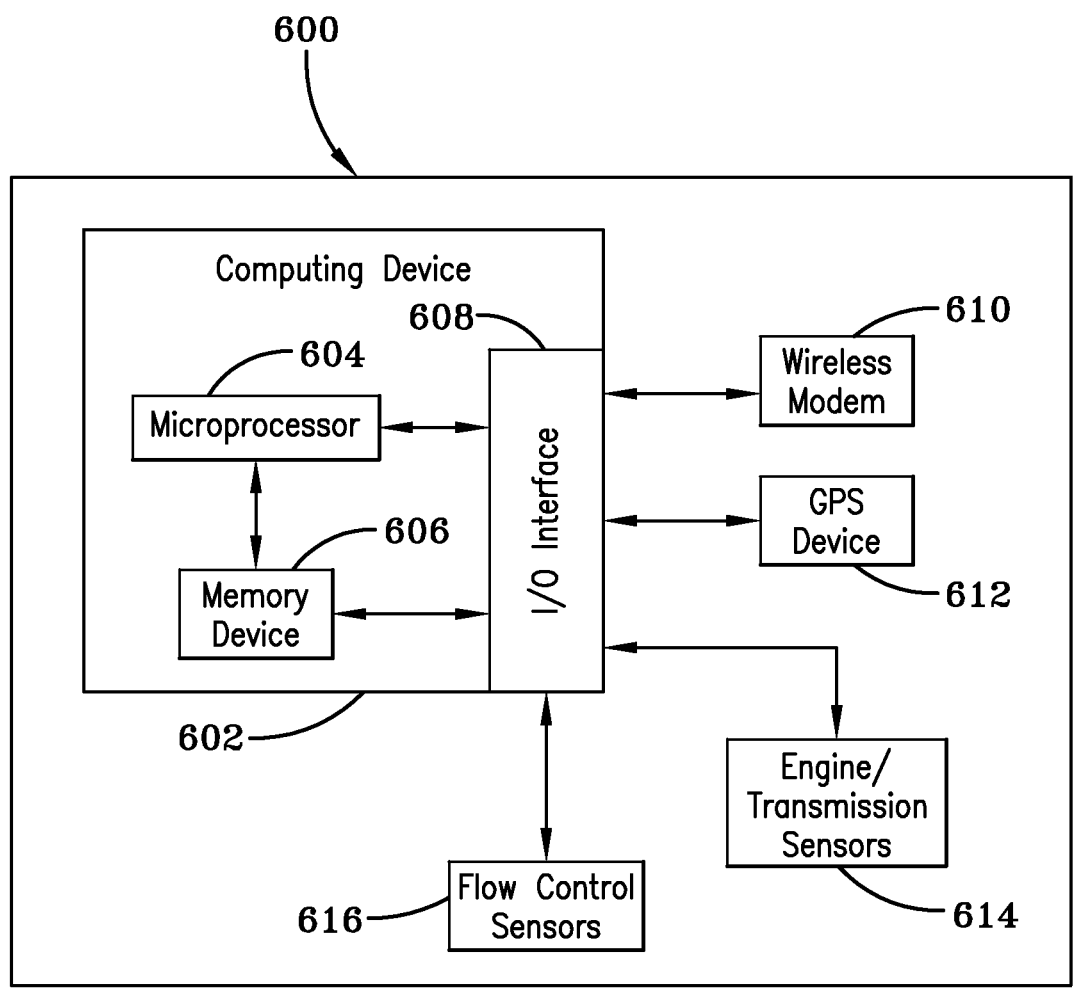
FIG. 6 shows schematically an exemplary embodiment of a piece of equipment with corresponding components.

FIG. 6 shows schematically components on a piece of equipment that may be used by the equipment monitoring system. The piece of equipment 600 can have a computing device 602 that includes a microprocessor 604, a memory device 606 and an I/O interface 608. The I/O interface 608 can permit communication between the computing device 602 and other components of the piece of equipment 600. The piece of equipment 600 can also include a wireless modem 610 to permit the piece of equipment 600 to communicate over the Internet. A GPS device 612 can be used to determine the position of the piece of equipment 600. Engine/transmission sensors 614 and flow control sensors 616 can be used to monitor the parameters of the piece of equipment 600.

In one exemplary embodiment, the pieces of machinery or equipment can be agricultural equipment. In another exemplary embodiment, the pieces of machinery or equipment can be fertilizer applicators (self-propelled or pulled), sprayers (self-propelled or pulled) and aerial equipment (agriculture application).

In one exemplary embodiment, the equipment monitoring system can communicate with the computer for the piece of equipment and any other associated components, e.g., GPS device, sensors, controller(s), by any suitable wireless communication technique. For example, the equipment monitoring system can communicate through cellular communication technology or satellite communication technology. It is to be understood that the computer for the piece of equipment and any other associated components, e.g., GPS device, sensors, controller(s), incorporate the appropriate hardware, e.g., transmitters, receivers, amplifiers, etc., and/or software to enable effective communication for the corresponding wireless technology.

In one exemplary embodiment, the equipment monitoring system can be completely web-based and permit users to monitor critical system functions such as the engine, the transmission, the electrical system(s), the hydraulic system(s) and controller remotely. The equipment monitoring system permits users to wirelessly send map files to the machine and receive as-applied logs back from the machine. The equipment monitoring system can include online maintenance logs and vehicle tracking, which vehicle tracking updates can occur at one minute updates or other suitable update period.

In one exemplary embodiment, the user computer and the equipment computers can include the appropriate user interfaces, monitors, displays or other associated equipment or software to enable a user or operator to interact with the equipment monitoring system.

Embodiments within the scope of the present application include program products having machine-readable media for carrying or having machine-executable instructions or data structures stored thereon. Machine-readable media can be any available non-transitory media that can be accessed by a general purpose or special purpose computer or other machine with a processor. By way of example, machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An equipment management system for monitoring agricultural equipment, the equipment management system comprising:

a first computing device mounted on a piece of agricultural equipment;

a global positioning system device mounted on the piece of agricultural equipment, the global positioning system device being configured to calculate a position of the piece of agricultural equipment and provide the calculated position to the first computing device;

a sensor configured and positioned to measure an operational parameter of the piece of agricultural equipment, the sensor being configured to provide the measured operational parameter to the first computing;

a wireless modem in communication with the first computing device, the wireless modem being configured to send and receive information over the Internet;

a second computing device located remote from the first computing device, the second computing device being configured to receive position and operational parameter information transmitted by the wireless modem from the first computing device and to display the received positional and operational parameter information for a user;

an additional sensor configured and positioned to measure a flow control parameter of the piece of agricultural equipment, the additional sensor being configured to provide the measured flow control parameter to the first computing device;

the flow control parameter of the piece of agricultural equipment corresponds to at least one of an application rate for a tank associated with the piece of agricultural equipment, a hydraulic pressure associated with the piece of agricultural equipment or a speed of rotating components associated with the piece of agricultural equipment and the flow control parameter information includes a map with information on an application of materials by the piece of agricultural equipment;

said second computing device is configured to receive flow control parameter information transmitted by the wireless modem from the first computing device and to display the received flow control parameter information for a user;

the information on an application of materials by the piece of agricultural equipment includes at least one of a prescription plan for a predetermined location where the piece of agricultural equipment is operating, a position of the piece of agricultural equipment relative to the predetermined location or an area of the predetermined location where the prescription plan has been applied by the piece of agricultural equipment;

the prescription plan includes a plurality of zones in the predetermined location, each zone of the plurality of zones includes different treatment options or equipment configurations;

positional information includes at least one of map coordinates for the piece of agricultural equipment, wind speed and direction at a location of the piece of agricultural equipment, a weather radar image for the location of the piece of agricultural equipment, a speed of the piece of agricultural equipment or a corresponding street address of the location of the piece of agricultural equipment;

the second computing device is configured to transmit information to the first computing device, the transmitted information to the first computing device includes at least one of a prescription plan for a predetermined area or map coordinates for the piece of agricultural equipment;

the second computing device being configured to access the first computing device to perform maintenance on the piece of agricultural equipment; and an equipment monitoring system comprising:

a first computer algorithm executable by a microprocessor from the first computer, the first computer algorithm operates to permit a user to view a location of each piece of equipment having a second computer, obtain status information on each piece of equipment having a second computer and transmit job information to any piece of equipment having a second computer;

a second computer algorithm executable by a microprocessor from a second computer, the second computer algorithm operates to transmit position information on the corresponding piece of equipment to the first computer, transmit status information on the corresponding piece of equipment to the first computer and perform a job in accordance with job information received from the first computer;

the first computer algorithm operates to display the location of each piece of equipment on a map;

the first computer algorithm operates to permit a user to select a displayed piece of equipment on the map to obtain further information on the selected piece of equipment;

the further information on the selected piece of equipment includes the transmitted position information from the corresponding second computer and the transmitted status information from the corresponding second computer; and the transmitted position information includes at least one of map coordinates for the selected piece of equipment, wind speed and direction at a location of the selected piece of equipment, a weather radar image for the location of the selected piece of equipment, a speed of the selected piece of equipment or a corresponding street address of the location of the selected piece of equipment.

* * * * *